US012098866B2

(12) United States Patent
Du

(10) Patent No.: US 12,098,866 B2
(45) Date of Patent: Sep. 24, 2024

(54) TUBULAR THICK FILM HEATER PROTECTION APPARATUS AND TUBULAR THICK FILM HEATER

(71) Applicant: HEATING LEADER ELECTRONIC TECHNOLOGY CO., LTD, Foshan (CN)

(72) Inventor: Shaoling Du, Foshan (CN)

(73) Assignee: HEATING LEADER ELECTRONIC TECHNOLOGY CO., LTD, Foshan (CN)

( * ) Notice: Subject to any disclaimer, the term of this patent is extended or adjusted under 35 U.S.C. 154(b) by 740 days.

(21) Appl. No.: 17/242,243

(22) Filed: Apr. 27, 2021

(65) Prior Publication Data

US 2021/0247101 A1 Aug. 12, 2021

Related U.S. Application Data

(63) Continuation of application No. PCT/CN2018/118201, filed on Nov. 29, 2018.

(30) Foreign Application Priority Data

Nov. 1, 2018 (CN) ........................ 201811295678.1

(51) Int. Cl.
*F24H 1/14* (2022.01)
*F24H 9/18* (2022.01)
(Continued)

(52) U.S. Cl.
CPC ........... *F24H 1/142* (2013.01); *F24H 9/1818* (2013.01); *F24H 9/2028* (2013.01);
(Continued)

(58) Field of Classification Search
CPC .......... F24H 1/102; F24H 1/142; F24H 1/162; F24H 15/37; F24H 9/1818; F24H 9/2028;
(Continued)

(56) References Cited

U.S. PATENT DOCUMENTS

2002/0001461 A1 1/2002 Bresolin
2009/0260583 A1* 10/2009 Choi ...................... F24H 1/182
122/19.2

(Continued)

FOREIGN PATENT DOCUMENTS

CN 205381971 U 7/2016
CN 205481783 U 8/2016

(Continued)

OTHER PUBLICATIONS

International Search Report issued in corresponding International application No. PCT/CN2018/118201, mailed Jul. 29, 2019.

(Continued)

*Primary Examiner* — Justin C Dodson
(74) *Attorney, Agent, or Firm* — Jeena Park

(57) ABSTRACT

The present invention discloses a tubular thick film heater protection apparatus, including: an upper tube, where the upper tube includes an upper tube side surface and a toroid; an outer ring surface of the toroid is integrally connected to an upper portion of the upper tube side surface, a flange downwardly extends along an inner ring surface of the toroid, and a space between the flange and an inner side wall of the upper tube side surface forms an upper groove; and a base, where the base is provided with a lower groove, the base is provided with an elastic contact piece, and a terminal contact of the elastic contact piece can be connected to an electrode through contact; and the base is provided with a wiring terminal. The present invention further discloses a tubular thick film heater with a protection function.

12 Claims, 8 Drawing Sheets

(51) Int. Cl.

| | |
|---|---|
| ***F24H 9/1818*** | (2022.01) |
| ***F24H 9/20*** | (2022.01) |
| ***F24H 15/128*** | (2022.01) |
| ***F24H 15/14*** | (2022.01) |
| ***F24H 15/219*** | (2022.01) |
| ***F24H 15/34*** | (2022.01) |
| ***F24H 15/37*** | (2022.01) |
| ***F28F 1/40*** | (2006.01) |
| ***H05B 3/02*** | (2006.01) |
| *F24H 15/281* | (2022.01) |
| *F24H 15/288* | (2022.01) |
| *F24H 15/395* | (2022.01) |

(52) U.S. Cl.

CPC ........... *F24H 15/128* (2022.01); *F24H 15/14* (2022.01); *F24H 15/219* (2022.01); *F24H 15/34* (2022.01); *F24H 15/37* (2022.01); *F28F 1/405* (2013.01); *H05B 3/02* (2013.01); *F24H 15/281* (2022.01); *F24H 15/288* (2022.01); *F24H 15/395* (2022.01); *H05B 2203/007* (2013.01); *H05B 2203/016* (2013.01); *H05B 2203/021* (2013.01)

(58) Field of Classification Search

CPC ..... F28F 1/405; H05B 1/0244; H05B 1/0283; H05B 1/0291; H05B 1/0297; H05B 3/06; H05B 3/78; H05B 2203/007; H05B 2203/016; H05B 2203/021

See application file for complete search history.

(56) References Cited

U.S. PATENT DOCUMENTS

| | | | | |
|---|---|---|---|---|
| 2011/0041705 | A1* | 2/2011 | Reichl ...................... | H05B 3/40 99/323.3 |
| 2015/0016811 | A1 | 1/2015 | Flint et al. | |
| 2016/0366940 | A1* | 12/2016 | Liu ......................... | A24F 40/30 |
| 2019/0053542 | A1* | 2/2019 | Chen .................... | A61M 11/042 |

FOREIGN PATENT DOCUMENTS

| | | |
|---|---|---|
| CN | 108449814 A | 8/2018 |
| CN | 108458474 A | 8/2018 |

OTHER PUBLICATIONS

Opinion of the International Searching Authority for No. PCT/CN2018/118201.

* cited by examiner

TUBULAR THICK FILM HEATER PROTECTION APPARATUS AND TUBULAR THICK FILM HEATER

TECHNICAL FIELD

The present invention relates to the field of liquid heater technologies, and in particular, to a protection apparatus for protecting a tubular thick film heater, and a tubular thick film heater with a protection function.

BACKGROUND

In applications, a tubular thick film heater needs to be electrically connected to and controlled by an external circuit. When the heater operates, a surface of a heating resistor is energized, and an operating temperature is high. Therefore, safety protection and heat insulation from the external circuit are needed.

However, an existing tubular thick film heater is protected only by a protective housing mounted outside a tubular heater assembly, and cannot properly implement electrical and heat isolation between the tubular thick film heater and an external circuit during operation. Therefore, the existing tubular thick film heater causes certain danger.

SUMMARY

The present invention aims to provide a tubular thick film heater protection apparatus to protect a tubular heater assembly, thereby solving a problem that an existing tubular thick film heater does not properly provide insulation protection during operation.

A tubular thick film heater protection apparatus provided in the embodiments of the present invention is implemented by using the following technical solutions:

A tubular thick film heater protection apparatus is configured to protect a tubular heater assembly and includes:

- an upper tube, where the upper tube includes an upper tube side surface and a toroid that are disposed with an inner space; an outer ring surface of the toroid is integrally connected to an upper portion of the upper tube side surface, and the radius of an inner ring surface of the toroid is less than the radius of an inner side surface of an inner tube of the tubular heater assembly; a flange downwardly extends along the inner ring surface of the toroid, and a space between the flange and an inner side wall of the upper tube side surface forms an upper groove that accommodates an upper portion of the tubular heater assembly; and a lower portion of the upper tube side surface is provided with a first locking mechanism; and
- a base, where a middle portion of the base is provided with a circular hole that allows a liquid discharge conduit of the tubular heater assembly to stick out, the base is further provided with a lower groove, the radius of an inner side surface of the lower groove is less than the radius of the inner side surface of the inner tube of the tubular heater assembly, and the radius of an outer side surface of the lower groove is greater than the radius of an outer side surface of an outer tube of the tubular heater assembly; the base is provided with an elastic contact piece, and when a lower portion of the tubular heater assembly is mounted on the lower groove, a terminal contact of the elastic contact piece can be connected to an electrode on the outer tube of the tubular heater assembly through contact; a side wall or the bottom of the base is provided with a wiring terminal, the wiring terminal is electrically connected to the elastic contact piece, and the wiring terminal can be externally connected to a power supply; and the base is provided with a second locking mechanism that matches and is locked with the first locking mechanism.

Further, the tubular thick film heater protection apparatus further includes a first annular groove sealing ring disposed in the upper groove and a second annular groove sealing ring disposed in the lower groove, where a groove width of the first annular groove sealing ring matches the width of the upper portion of the tubular heater assembly, and a groove width of the second annular groove sealing ring matches the width of the lower portion of the tubular heater assembly.

Further, the upper tube is a cylinder, the base is a cylindrical base, the tubular thick film heater protection apparatus further includes an annular sealing ring disposed on the cylindrical base, and the annular sealing ring is disposed in a junction portion between the cylinder and the cylindrical base.

Further, the base is provided with a first positioning apparatus, and the first positioning apparatus is configured to determine a matching position between the tubular heater assembly and the base, so that the terminal contact of the elastic contact piece can be connected to the electrode on the outer tube of the tubular heater assembly through contact; and a second positioning apparatus is disposed on the downward inner ring flange of the toroid, and the second positioning apparatus is configured to determine a matching position between the tubular heater assembly and the upper tube to implement position matching between the first locking mechanism and the second locking mechanism.

Further, the first locking mechanism includes a clip with a bayonet, the second locking mechanism includes an elastic component clamp with a protrusion, and a locking function can be implemented by matching the protrusion of the clamp with the bayonet of the clip;

or:

- the second locking mechanism includes a clip with a bayonet, the first locking mechanism includes an elastic component clamp with a protrusion, and a locking function can be implemented by matching the protrusion of the clamp with the bayonet of the clip.

Further, when the first locking mechanism is a clip with a bayonet, the bayonet is disposed on a lower portion of an inner side surface of the upper tube; and a mounting and fastening apparatus is disposed on an outer side wall of the upper tube.

An embodiment of the present invention further provides a tubular thick film heater, including:

- an inner tube, where a spiral flow guide structure is configured on an outer peripheral wall of the inner tube; and
- an outer tube, where the outer tube is sleeved outside the spiral flow guide structure; an outer peripheral wall of the outer tube is provided with a heating assembly; and an inner peripheral wall of the outer tube is spaced from the spiral flow guide structure by a predetermined radial gap; where
- a flow channel is formed between the inner tube and the outer tube, and an opening on at least one end of the flow channel is covered by a sealing end cover; and a cavity wall of the flow channel is provided with a liquid inlet and a liquid outlet; and
- the sealing end cover is an annular sealing end cover, and the annular sealing end cover includes an inner circular wall and an outer circular wall that are concentrically disposed, an upper sealing surface separately connected to an upper portion of the inner circular wall and an upper portion of the outer circular wall, and a lower sealing surface separately connected to a lower portion of the inner circular wall and a lower portion of the outer circular wall, where the inner circular wall is fastened to an outer peripheral wall termination of the inner tube through sealing, and the outer circular wall is fastened to an inner peripheral wall termination of the outer tube through sealing.

Further, the inner circular wall is sealed with the outer peripheral wall termination of the inner tube through welding, and the outer circular wall is sealed with the inner peripheral wall termination of the outer tube through welding.

Further, the spiral flow guide structure is formed by a spiral metal wire sleeved on the inner tube; the spiral metal wire is a stainless steel wire, and the stainless steel wire is welded to the outer peripheral wall of the inner tube; and/or an axial cross-sectional shape of the spiral metal wire is a triangle, a trapezoid, or a rectangle, and/or two ends of the inner tube are respectively flush with two ends of the outer tube.

Further, both the inner tube and the outer tube are stainless steel tubes.

Further, the heating assembly includes an insulation medium layer configured on the outer peripheral wall of the outer tube and a heating circuit configured at the insulation medium layer, the heating circuit includes multiple heating resistors and electrodes that are fastened to the insulation medium layer, and two ends of the heating resistor are electrically connected to the electrodes, respectively.

Further, an extension direction of each of the heating resistors is the same as the length direction of the outer tube; the liquid inlet is connected to a water pump; and the tubular thick film heater further includes a first temperature sensor and a first controller electrically connected to the first temperature sensor; where the first temperature sensor is configured at a position on the outer tube that is close to the liquid outlet, and the first controller is configured to control a liquid intake speed of the water pump and/or heating power of the heating resistors based on temperature information sent by the first temperature sensor.

Further, the multiple heating resistors are distributed around the outer peripheral wall of the outer tube; and the tubular thick film heater further includes a second temperature sensor and a second controller electrically connected to the second temperature sensor; where the second temperature sensor is disposed on the outer tube and close to the heating resistors, and is configured to detect an outer tube temperature at a position of the second temperature sensor; and the second controller is configured to receive the outer tube temperature sent by the second temperature sensor, and when the outer tube temperature is higher than a first preset temperature threshold in a first preset heating time period, control the heating circuit to be disconnected and/or send no-liquid burning warning information.

This application further provides a tubular thick film heater with a protection function, including the tubular thick film heater protection apparatus described above, and further including a tubular heater assembly; where an upper portion of the tubular heater assembly is sleeved inside the upper groove, and a lower portion of the tubular heater assembly is sleeved inside the lower groove; and the tubular heater assembly includes:

an inner tube, where a spiral flow guide structure is configured on an outer peripheral wall of the inner tube; and an outer tube, where the outer tube is sleeved outside the spiral flow guide structure; an outer peripheral wall of the outer tube is provided with a heating assembly; and an inner peripheral wall of the outer tube is spaced from the spiral flow guide structure by a predetermined radial gap; where a flow channel is formed between the inner tube and the outer tube, and an opening on at least one end of the flow channel is covered by a sealing end cover; and a cavity wall of the flow channel is provided with a liquid inlet and a liquid outlet; and the sealing end cover is an annular sealing end cover, and the annular sealing end cover includes an inner circular wall and an outer circular wall that are concentrically disposed, an upper sealing surface separately connected to an upper portion of the inner circular wall and an upper portion of the outer circular wall, and a lower sealing surface separately connected to a lower portion of the inner circular wall and a lower portion of the outer circular wall, where the inner circular wall is fastened to an outer peripheral wall termination of the inner tube through sealing, and the outer circular wall is fastened to an inner peripheral wall termination of the outer tube through sealing.

Further, the spiral flow guide structure is formed by a spiral metal wire sleeved on the inner tube.

Further, the spiral metal wire is a stainless steel wire, and the stainless steel wire is welded to the outer peripheral wall of the inner tube; and/or an axial cross-sectional shape of the spiral metal wire is a triangle, a trapezoid, or a rectangle, and/or two ends of the inner tube are respectively flush with two ends of the outer tube.

Further, the heating assembly includes an insulation medium layer configured on the outer peripheral wall of the outer tube and a heating circuit configured at the insulation medium layer, the heating circuit includes multiple heating resistors and electrodes that are fastened to the insulation medium layer, and two ends of the heating resistor are electrically connected to the electrodes, respectively.

Further, an extension direction of each of the heating resistors is the same as the length direction of the outer tube; the liquid inlet is connected to a water pump; and the heater assembly further includes a first temperature sensor and a first controller electrically connected to the first temperature sensor; where the first temperature sensor is configured at a position on the outer tube that is close to the liquid outlet, and the first controller is configured to control a liquid intake speed of the water pump and/or heating power of the heating resistors based on temperature information sent by the first temperature sensor.

Further, the multiple heating resistors are distributed around the outer peripheral wall of the outer tube; and the heater assembly further includes a second temperature sensor and a second controller electrically connected to the second temperature sensor; where the second temperature sensor is disposed on the outer tube and close to the heating resistors, and is configured to detect an outer tube temperature at a position of the second temperature sensor; and the second controller is configured to receive the outer tube temperature sent by the second temperature sensor, and when the outer tube temperature is higher than a first preset temperature threshold in a first preset heating time period or is higher than a second preset temperature threshold during operation, control the heating circuit to be disconnected and/or send over-temperature protection warning information.

Further, the heating resistors directly face the spiral flow guide structure through a stainless steel tube, and an inner wall of the outer tube directly facing the heating resistors is inside the liquid flow channel.

Compared with the prior art, the beneficial effects of the present invention are as follows: A sealing end cover is used to seal and connect to an end portion of the flow channel formed by the inner tube and the outer tube. Specifically, after the sealing end cover is snapped to the end portion of the flow channel formed by the inner tube and the outer tube, a first turnup edge and a second turnup edge on the sealing end cover are welded to the inner tube and the outer tube. Such a manner of separately processing the sealing and connecting structure facilitates manufacturing and avoids a complex process for turnup edges on the inner tube and the outer tube. It is easy to implement batch production, reduces manufacturing costs, and features a good sealing effect and improves stability performance of a heating apparatus in a high-temperature and high-pressure environment for a long term.

Figure 1:
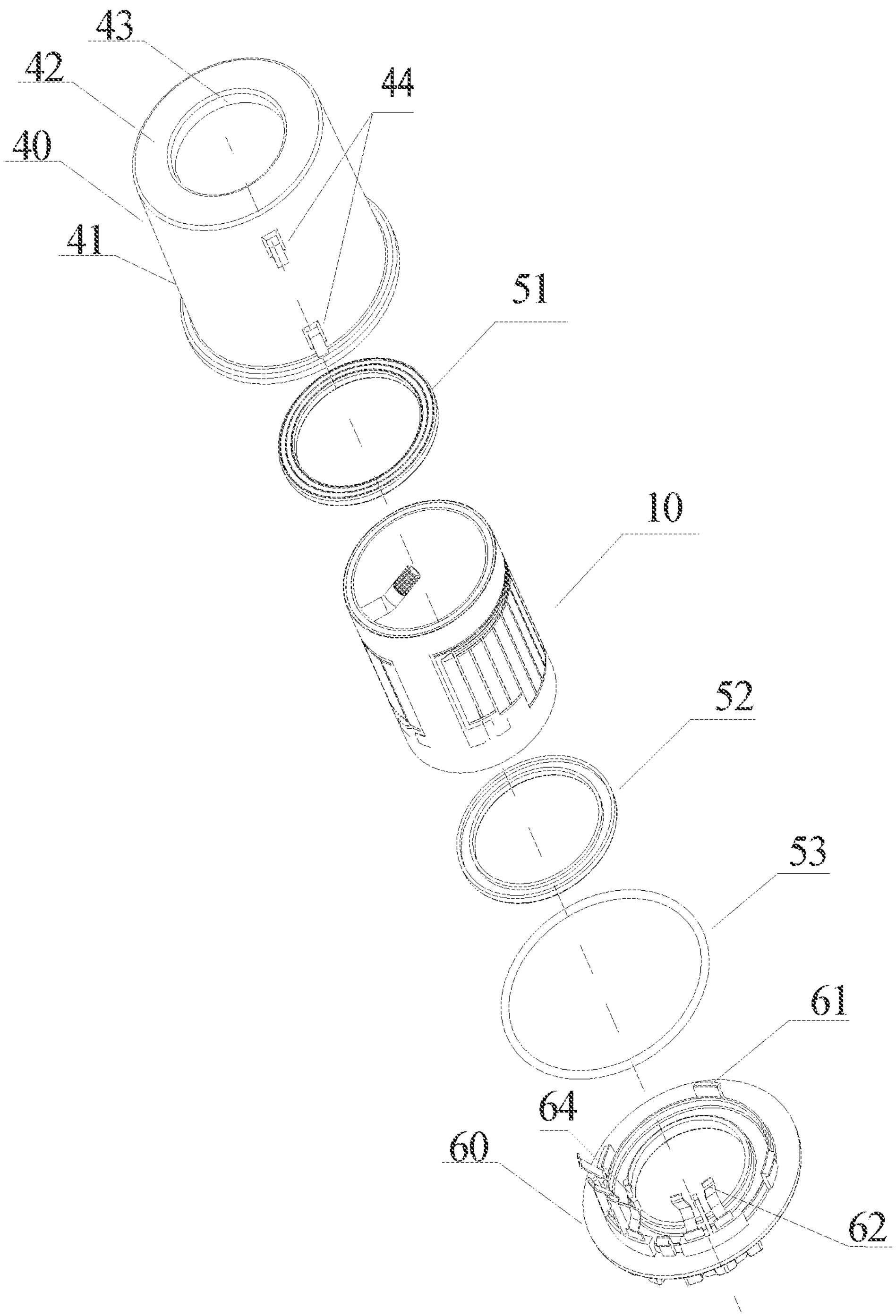
FIG. 1 is an exploded schematic structural diagram of a tubular thick film heater with a protection function according to an embodiment of the present invention.

In the drawings: 10: tubular heater assembly; 1: inner tube; 11: spiral flow guide structure; 12: liquid inlet; 121: liquid intake conduit; 13: liquid outlet; 131: liquid discharge conduit; 14: flow channel; 20: heating assembly; 21: outer tube; 211: insulation medium layer; 22: heating circuit; 221: heating resistor; 222: electrode; 223: first temperature sensor; 224: second temperature sensor; 3: annular sealing end cover; 31: inner circular wall; 32: outer circular wall; 33: upper sealing surface; 34: lower sealing surface; 40: upper tube; 41: upper tube side surface; 42: toroid; 43: inner ring surface; 44: mounting and fastening apparatus; 45: flange; 46: first locking mechanism; 47: upper groove; 48: second positioning apparatus; 51: first annular groove sealing ring; 52: second annular groove sealing ring; 53: annular sealing ring; 60: base; 61: second locking mechanism; 62: elastic contact piece; 63: lower groove; 64: first positioning apparatus; 65: wiring terminal; 70: sealed space.

DESCRIPTION OF EMBODIMENTS

The following further describes the present invention with reference to the accompanying drawings and specific implementations. It should be noted that, the embodiments or technical features described below can be randomly combined to form new embodiments, provided that there is no conflict.

It should be understood that, in description of the present invention, directions or positional relations indicated by terms such as "center", "longitudinal", "transversal", "up", "down", "before", "after", "left", "right", "horizontal", "vertical", "top", "inside", and "outside" are the directions or positional relations based on the drawings, which are just to describe the present invention easily and simplify the description, but do not indicate or imply that an indicated apparatus or element must have a specific direction or must be constructed and operated in a specific direction.

Therefore, this cannot be understood as a limitation on the present invention. In addition, the terms "first" and "second" are used only for descriptive purposes and cannot be construed as indicating or implying relative importance.

In the description of the present invention, it should be noted that, the terms "mounting" "connection", and "connect" should be understood in a broad sense unless otherwise stipulated and limited. For example, "connection" may be a fixed connection, a detachable connection, or an integrated connection; may be a mechanical connection or an electrical connection; and may be a direct connection, a connection through an intermediate medium, or a connection inside two elements. For a person of ordinary skill in the art, specific meanings of the foregoing terms in the present invention can be understood based on specific situations.

As shown in FIG. 1 to FIG. 5, an embodiment of the present invention provides a tubular thick film heater with a protection function, including a tubular thick film heater protection apparatus and a tubular heater assembly 10. An upper portion of the tubular heater assembly 10 is sleeved inside an upper groove 47 of an upper tube 40, and a lower portion of the tubular heater assembly 10 is sleeved inside a lower groove 63 of a base 60. Further, the upper portion of the tubular heater assembly 10 is first sleeved inside a groove of a first annular groove sealing ring 51, and then the first annular groove sealing ring 51 is sleeved inside the upper groove 47. The lower portion of the tubular heater assembly 10 is first sleeved inside a groove of a second annular groove seal ring 52, and then the second annular groove seal ring 52 is sleeved inside the lower groove 63. By sleeving the first annular groove sealing ring 51 and the second annular groove sealing ring 52 on the upper portion and lower portion of the tubular heater assembly 10, the tubular heater assembly 10 can be more tightly connected to the tubular thick film heater protection apparatus, so that a relatively isolated and sealed space 70 formed by a surface of a heating circuit 22 of the tubular heater assembly 10, the upper tube 40, and the base 60 becomes more tightly sealed, thereby reducing impact of external air on the surface of the heating circuit 22, reducing heat loss in the sealed space 70, and improving heating efficiency.

The tubular thick film heater protection apparatus is configured to protect the tubular heater assembly 10 and includes:

- an upper tube 40, where the upper tube 40 includes an upper tube side surface 41 and a toroid 42 that are disposed with an inner space; an outer ring surface of the toroid 42 is integrally connected to an upper portion of the upper tube side surface 41, and the radius of an inner ring surface 43 of the toroid 42 is less than the radius of an inner side surface of an inner tube 1 of the tubular heater assembly 10; a flange 45 downwardly extends along the inner ring surface 43 of the toroid 42, and a space between the flange 45 and an inner side wall of the upper tube side surface 41 forms an upper groove 47 that accommodates an upper portion of the tubular heater assembly 10; and a lower portion of the upper tube side surface 41 is provided with a first locking mechanism 46; and a base 60, where a middle portion of the base 60 is provided with a circular hole that allows a liquid discharge conduit 131 of the tubular heater assembly 10 to stick out, the base 60 is further provided with a lower groove 63, the radius of an inner side surface of the lower groove 63 is less than the radius of an inner side surface of the inner tube 1 of the tubular heater assembly 10, and the radius of an outer side surface of the lower groove 63 is greater than the radius of an outer side surface of an outer tube 21 of the tubular heater assembly 10; the base 60 is provided with an elastic contact piece 62, and when a lower portion of the tubular heater assembly 10 is mounted on the lower groove 63, a terminal contact of the elastic contact piece 62 can be connected to an electrode 222 on the outer tube 21 of the tubular heater assembly 10 through contact; a side wall or the bottom of the base 60 is provided with a wiring terminal 65, the wiring terminal 65 is electrically connected to the elastic contact piece 62, and the wiring terminal 65 can be externally connected to a power supply; and the base 60 is provided with a second locking mechanism 61 that matches and is locked with the first locking mechanism 46. A power cable may be directly disposed for the wiring terminal 65, and the wiring terminal 65 may connect to a socket through the power cable, thereby implementing power supply. The wiring terminal may also be disposed as a power supply jack to implement power supply through a power cable of a matching interface.

According to the tubular thick film heater protection apparatus provided in the embodiments of the present invention, the upper tube 40 coordinates with the base 60 such that the tubular heater assembly 10 is sleeved inside the sealed space 70 formed by the upper tube 40 and the base 60. In this way, relative isolation is implemented between the surface of the heating circuit 22 of the tubular heater assembly 10 and external air. This prevents an external environment from affecting the surface of the heating circuit 22 of the tubular heater assembly 10 and further affecting the heater, and further avoids possible electrical shock accidents caused by energizing the surface of the heating circuit 22 of the tubular heater assembly 10 during operation of the tubular heater assembly 10 to protect operators.

The upper tube 40 and the base 60 are preferably made of a heat insulation and flame retardant material. Shapes of the upper tube 40 and the base 60 are not specifically limited. In the embodiments of the present invention, a preferred implementation is a cylinder for the upper tube 40, and is a cylindrical base for the base 60. An annular sealing ring 53 is further disposed on a junction portion between the upper tube 40 and the base 60, that is, the annular sealing ring 53 surrounds the bottom of the upper tube side surface 41. Further, a circular bottom flange may be extended in an outward direction or an inward direction of the lower portion of the upper tube side surface, and the bottom flange increases a contact area between the upper tube side surface 41 and the base 60, so that a connection can be more stable and reliable. In addition, a groove for accommodating the annular sealing ring 53 may be disposed on a corresponding position on each of a bottom surface of the bottom flange and an upper surface of the base 60. An upper portion of the annular sealing ring 53 is inserted into the groove of the bottom flange, and a lower portion is inserted into the corresponding groove of the base, thereby implementing a better sealing effect, and further reducing heat loss and improving heating efficiency.

The base 60 is further provided with a first positioning apparatus 64, and the first positioning apparatus 64 is configured to determine a matching position between the tubular heater assembly 10 and the base 60, so that the terminal contact of the elastic contact piece 62 may be connected to the electrode 222 on the outer tube 21 of the tubular heater assembly 10 through contact. The first positioning apparatus 64 may operate in various existing manners, for example, disposing an eye-catching sign on the base. When the liquid discharge conduit 131 of the tubular heater assembly 10 directly faces the sign, it indicates that positioning is complete. Such practice aims to position the tubular heater assembly 10 and the base 60, thereby implementing an electrical connection between the elastic contact piece 62 and the electrode 222. In a preferred embodiment of the present invention, the first positioning apparatus 64 is a stopper. When the tubular heater assembly 10 rotates along the lower groove 63 on the base 60, the stopper stops the liquid discharge conduit 131 at a corresponding position, thereby implementing positioning of the base and the tubular heater assembly 10 as designed. The stopper may be further disposed as an elastic stopper or disposed with a spring under the stopper. When the liquid discharge conduit 131 touches the stopper, the tubular heater assembly 10 may continue to rotate until the stopper is elastically deformed and holds the liquid discharge conduit 131. This design further implements a locking function for the tubular heater assembly 10 to some extent, and implements more accurate positioning.

A second positioning apparatus 48 is further disposed on the downward inner ring flange 45 of the toroid, and the second positioning apparatus 48 is configured to determine a matching position between the tubular heater assembly 10 and the upper tube 40, so as to implement position matching between the first locking mechanism 46 and the second locking mechanism 61. The second positioning apparatus 48 may operate in various existing manners, for example, disposing an eye-catching sign on the toroid 42. When the liquid intake conduit 121 of the tubular heater assembly 10 directly faces the sign, it indicates that positioning is complete. Such practice aims to position the tubular heater assembly 10 and the upper tube 40, thereby implementing position matching between the first locking mechanism 46 and the second locking mechanism 61. In a preferred embodiment of the present invention, the second positioning apparatus 48 is a stopper. When the tubular heater assembly 10 rotates along the upper groove 47 on the upper tube 40, the stopper stops the liquid intake conduit 121 in a corresponding position, thereby implementing positioning of the upper tube 40 and the tubular heater assembly 10 as designed. The stopper may be further disposed as an elastic stopper or disposed with a spring under the stopper. When the liquid intake conduit 121 touches the stopper, the tubular heater assembly 10 may continue to rotate until the stopper is elastically deformed and holds the liquid intake conduit 121. This design further implements a locking function for the tubular heater assembly 10 to some extent, and implements more accurate positioning.

Figure 4:
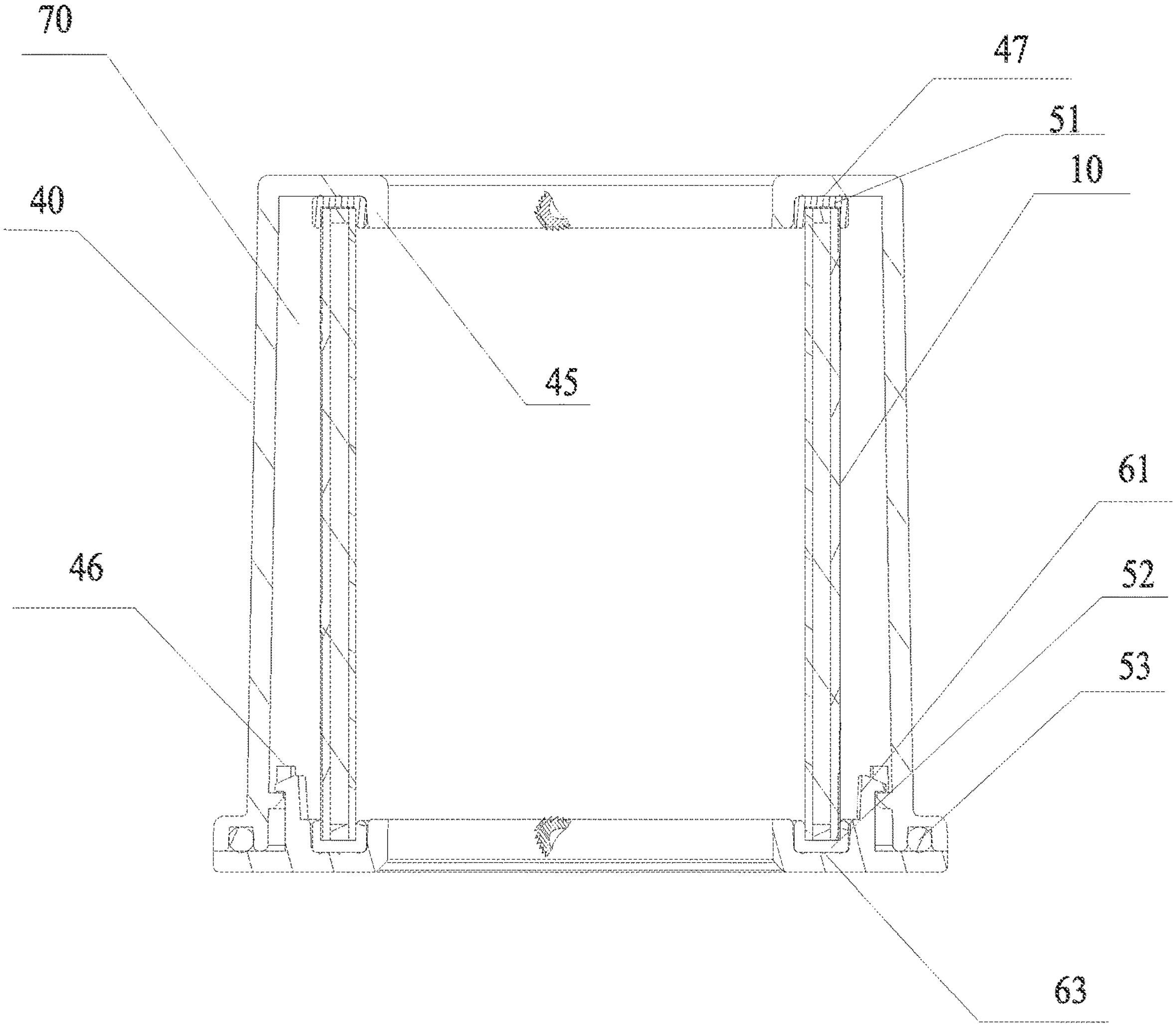
FIG. 4 is a cutaway drawing in a B-B direction in FIG. 3.
Figure 5:
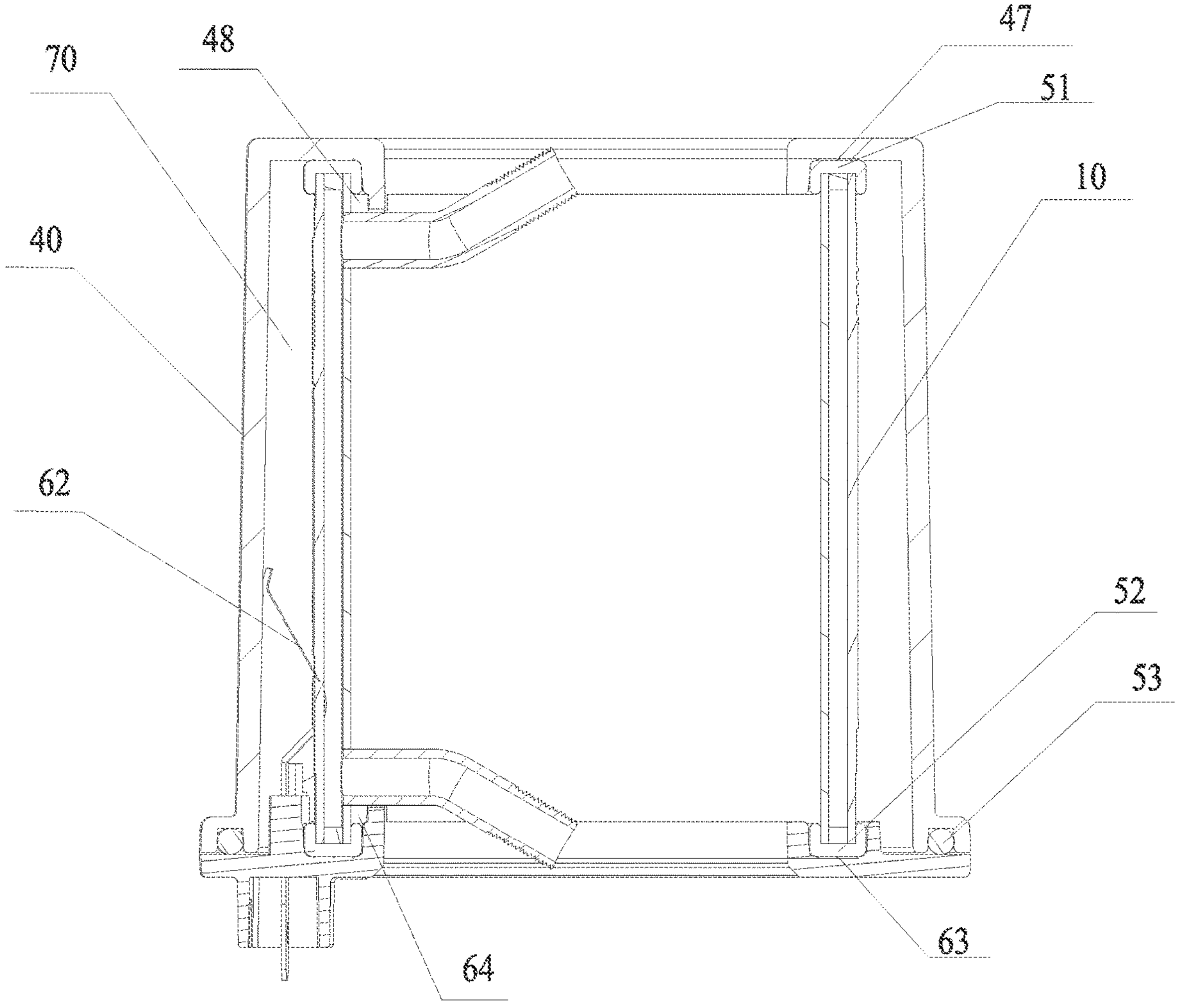
FIG. 5 is a cutaway drawing in a C-C direction in FIG. 3.
Figure 6:
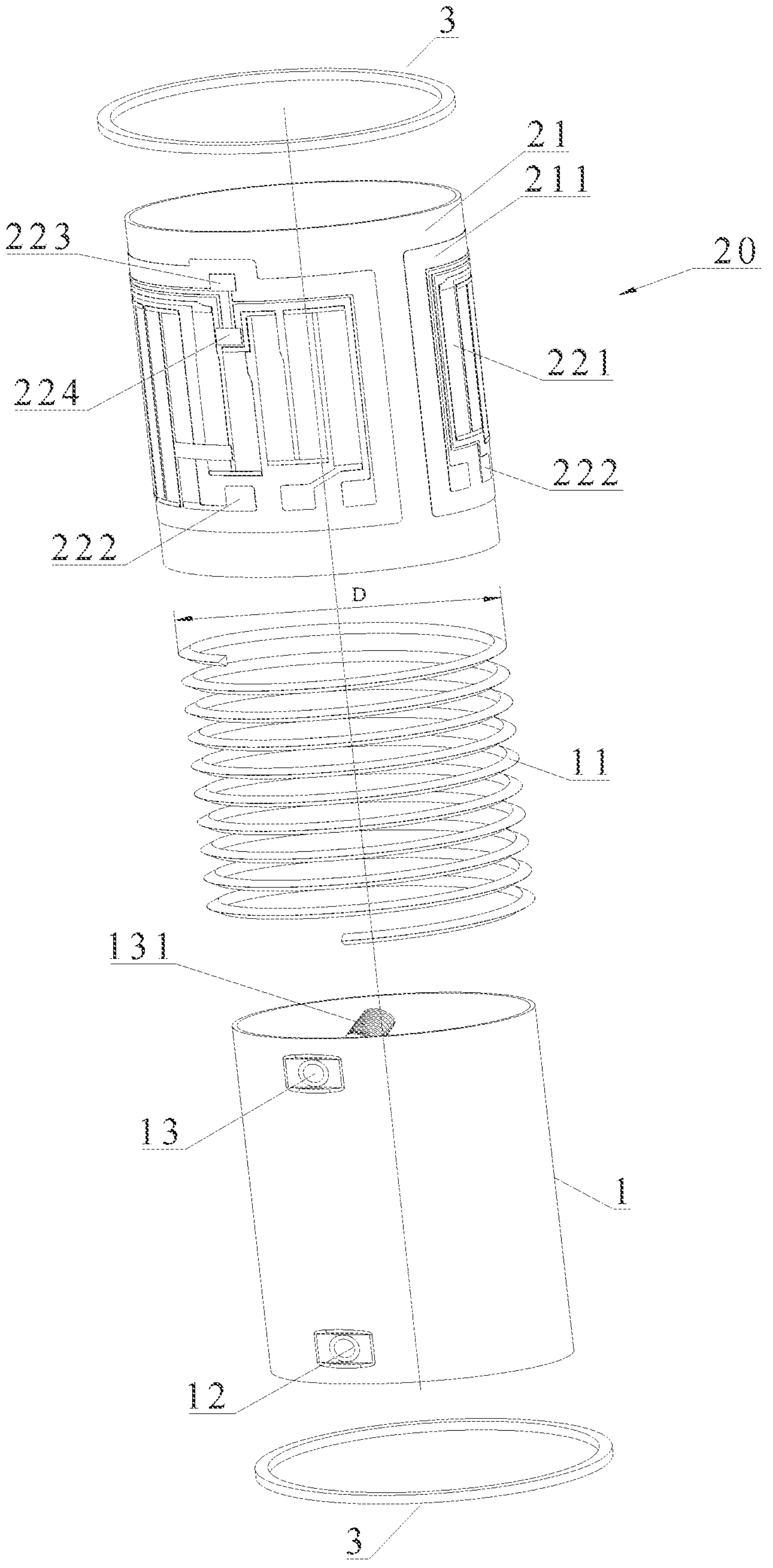
FIG. 6 is an exploded schematic structural diagram of a tubular heater assembly.

The first locking mechanism 46 and the second locking mechanism 61 may use existing implementable locking technical solutions. For example, the first locking mechanism 46 may be disposed as a protrusion with a groove, and the second locking mechanism 61 may be disposed as a ring, and the ring may be arranged in the groove of the protrusion to implement locking. In a preferred implementation provided in the present invention, as shown in FIG. 4, the first locking mechanism 46 includes a clip with a bayonet, and the second locking mechanism 61 includes an elastic component clamp with a protrusion, so that the protrusion of the clamp can match the bayonet of the clip to implement a locking function. According to the same function principle, the second locking mechanism 61 may be disposed to include a clip with a bayonet, and the first locking mechanism 46 may be disposed to include an elastic component clamp with a protrusion, so that the protrusion of the clamp can match the bayonet of the clip to implement a locking function.

Characteristically, the tubular thick film heater protection apparatus provided in the present invention may not need to be opened after the tubular heater assembly 10 is sleeved inside the protection apparatus. That is, generally, the tubular thick film heater is properly designed and is not prone to faults. When the tubular thick film heater encounters an occasional fault, it is basically replaced as a whole. When the first locking mechanism 46 provided in the embodiments of the present invention is disposed as a clip with a bayonet, the clip is disposed on a lower portion of an inner side surface of the upper tube 40, and the second locking mechanism 61 is an elastic component clamp with a protrusion. In a locking process of the upper tube 40 and the base 60, the upper tube is pressed down, so that the elastic component clamp is inwardly elastically deformed. When the upper tube continues to be pressed down and the protrusion of the clamp reaches a groove of the clip, locking is implemented through coordination of the protrusion and the groove. Because the clip of the first locking mechanism 46 is disposed inside the upper tube, the clamp cannot be detached from the clip after being locked. Therefore, the locking is one-time and undetachable, and problems caused by random disassembly not by a person skilled in the art can be prevented.

A mounting and fastening apparatus 44 is further disposed on an outer side wall of the upper tube 40. The mounting and fastening apparatus 44 is configured to implement a fixed connection between the entire tubular thick film heater and a protective housing.

FIG. 6 to FIG. 10 show a structure of a tubular heater assembly 10 according to an embodiment of the present invention. The tubular heater assembly 10 includes an inner tube 1, an outer tube 21, and a heating assembly 20 mounted on an outer peripheral wall of the outer tube 21. A spiral flow guide structure 11 is disposed on an outer peripheral wall of the inner tube 1, and the outer tube 21 is sleeved outside the spiral flow guide structure 11. The spiral flow guide structure 11, the outer peripheral wall of the inner tube 1, and an inner peripheral wall of the outer tube 21 jointly form a spiral flow channel 14 that a heated liquid passes through. The inner peripheral wall of the outer tube 21 is spaced from the spiral flow guide structure 11 by a predetermined radial gap, and the radial gap is disposed so that the inner tube 1 provided with the spiral flow guide structure 11 can be conveniently sleeved inside the outer tube 21, and further liquid can smoothly flow inside the flow channel 14 and the flowing liquid can be adequately heated. Notably, it can be understood that the inner tube 1 is roughly centered inside the outer tube 21, and the radial gap is equal to one half of a difference between an inner diameter of the outer tube 21 and an outer diameter D of the spiral flow guide structure 11. In this way, the flow channel 14 is formed between the inner tube 1 provided with the spiral flow guide structure 11 and the outer tube 21, and an opening on at least one end of the flow channel 14 is covered by a sealing end cover (openings at both ends of the flow channel 14 are covered by sealing end covers in this embodiment). In addition, a cavity wall of the flow channel is provided with a liquid inlet 12 and a liquid outlet 13. The sealing end cover is an annular sealing end cover 3, and the annular sealing end cover 3 includes an inner circular wall 31 and an outer circular wall 32 that are concentrically disposed, an upper sealing surface 33 separately connected to an upper portion of the inner circular wall 31 and an upper portion of the outer circular wall 32, and a lower sealing surface 34 separately connected to a lower portion of the inner circular wall 31 and a lower portion of the outer circular wall 32, where the inner circular wall 31 is fastened to an outer peripheral wall termination of the inner tube 1 through sealing, and the outer circular wall 32 is fastened to an inner peripheral wall termination of the outer tube 21 through sealing.

In this way, after liquid to be heated enters, from the liquid inlet 12, into the flow channel 14 formed by the spiral flow guide structure 11, the outer peripheral wall of the inner tube 1, and the inner peripheral wall of the outer tube 21, the liquid to be heated flows along the flow channel 14, and the heating assembly 20 mounted on the outer peripheral wall of the outer tube 21 heats the flowing liquid. Heat generated by the heating assembly 20 is exchanged with that of the liquid in the flow channel 14 after passing through the outer tube 21, so as to continuously heat the liquid. In addition, the annular sealing end cover 3 seals, through welding, the flow channel 14 formed by the inner tube 1 and the outer tube 21, so that the tubular heater assembly 10 can withstand an environment with a high temperature and high pressure. Finally, the heated liquid flows out of the liquid outlet 13. Preferably, a water pump is disposed at the liquid inlet 12 to continuously deliver pressurized liquid to the spiral flow channel 14.

In the technical solutions of the present invention, the sealing end cover is designed to be the annular sealing end cover 3. The annular sealing end cover 3 includes only four surfaces: the inner circular wall 31 and the outer circular wall 32 that are concentrically disposed, and the upper sealing surface 33 and the lower sealing surface 34. The foregoing four surfaces are regular surfaces and can be formed only by using a stamping or cutting process, unlike a U-shaped sealing end face, which needs to be stamped and stretched multiple times for formation. Therefore, a processing process is highly simplified, a processing control process is simple, and processing costs are low, while processing efficiency can be greatly improved.

Preferably, based on a design requirement of the tubular heater assembly 10 of the present invention, the inner circular wall is sealed with the outer peripheral wall termination of the inner tube through welding, and the outer circular wall is sealed with the inner peripheral wall termination of the outer tube 21 through welding. Laser welding or argon arc welding is preferred.

As a preferred implementation, a predetermined radial gap between the inner peripheral wall of the outer tube 21 and the spiral flow guide structure 11 is set in a range not greater than 1.0 mm, so that the inner tube 1 provided with the spiral flow guide structure 11 is easily sleeved inside the outer tube 21. Such practice further avoids the following situation caused by an overlarge radial gap: the liquid directly flows to the liquid outlet 13 through the radial gap along the length direction of the inner tube 1, instead of being guided through the spiral flow guide structure 11 on the outer peripheral wall of the inner tube 1, and the liquid cannot be adequately heated; or the following situation caused by an excessively small radial gap: the liquid is retained in the spiral flow guide structure 11 and is continuously heated by the heating assembly 20, and as a result, local overheating occurs and the retained liquid in this position is vaporized and discharged, and the liquid is intermittently discharged from the liquid outlet 13 with a large quantity of air bubbles. In the embodiments provided in the present invention, a large quantity of experiments prove that when the radial gap is set within a range of 0.00 mm to 1.0 mm, the liquid can be adequately heated, a good heating effect can be achieved, and liquid overheating can further be avoided while ensuring a smooth flow of the liquid and avoiding large bubbles.

Preferably, the spiral flow guide structure 11 is formed by a spiral metal wire sleeved on the inner tube 1, and the spiral metal wire is directly exposed to the liquid. It can be understood that the spiral metal wire should be a metal material that is insusceptible to rust and is harmless to the human body, so as to avoid blockage of the flow channel 14 caused by bubbles resulted from heating and aging of a wrapper of a rubber material for example, thereby prolonging a service life of the heating apparatus and improving edible safety.

As a preferred implementation, the spiral metal wire is configured as a stainless steel wire, and the stainless steel wire is welded to the outer peripheral wall of the inner tube 1 to avoid noise generated by shaking inside the flow channel 14; and/or an axial cross-sectional shape of the spiral metal wire is a triangle, a trapezoid, or a rectangle, and the bottom edge of the triangle or the trapezoid is welded onto the outer peripheral wall of the inner tube 1 to form a structure of the flow channel 14 that is simple, easy to produce, and features more stable flow performance. In addition, two ends of the inner tube 1 are respectively flush with those of the outer tube 21, so that the inner circular wall of the annular sealing end cover 3 is sealed with the outer peripheral wall termination of the inner tube 1 through laser welding, and the outer circular wall of the annular sealing end cover 3 is sealed with the inner peripheral wall termination of the outer tube 21 through laser welding.

Preferably, both the inner tube 1 and the outer tube 21 are disposed as stainless steel tubes to further improve edible safety.

Figure 7:
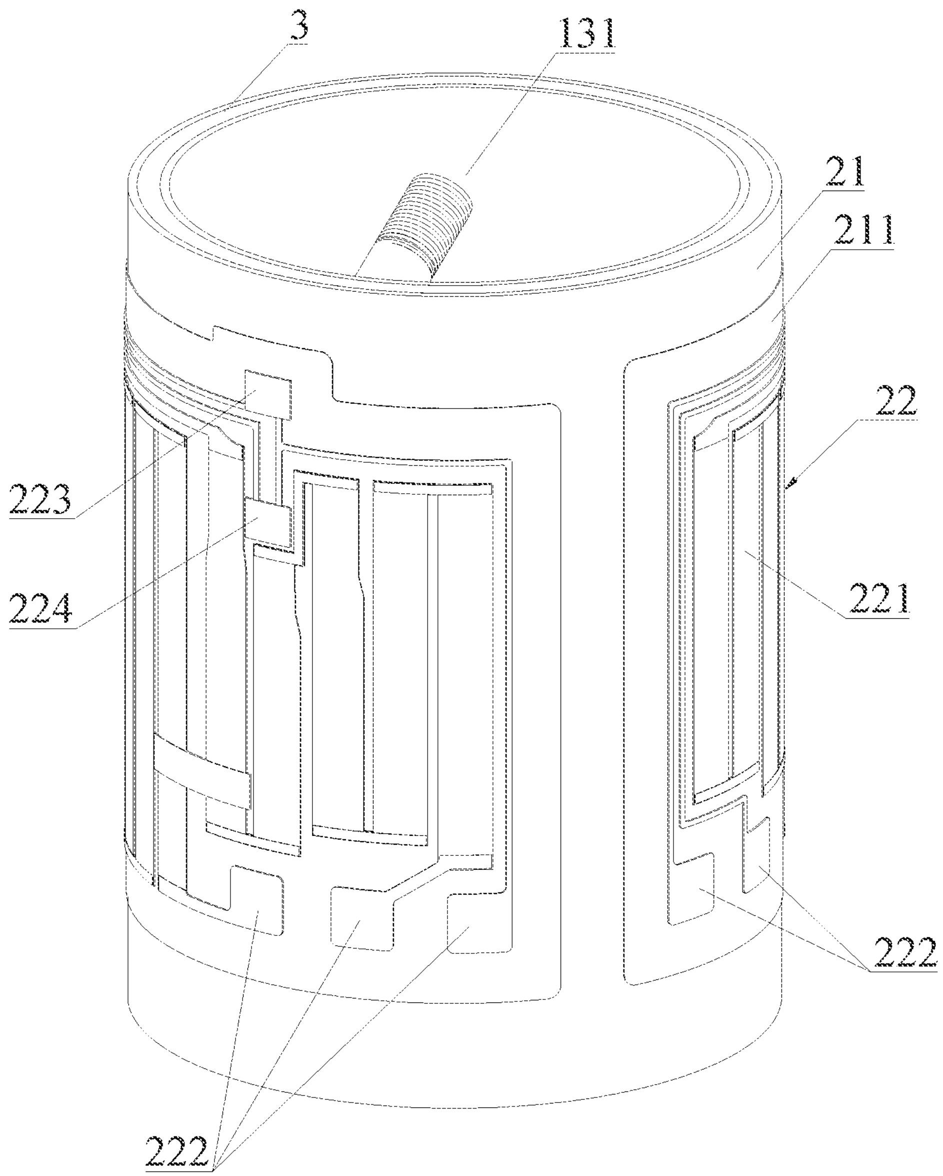
FIG. 7 is a 3-dimensional schematic structural diagram of FIG. 6.
Figure 8:
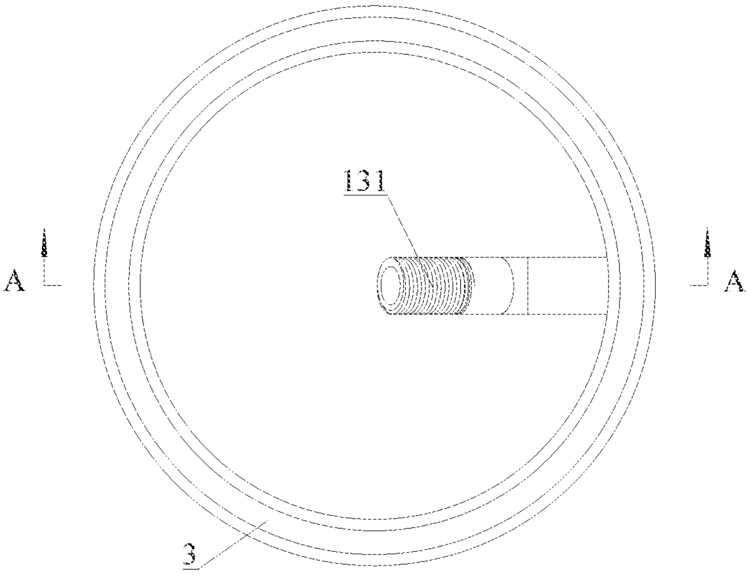
FIG. 8 is a top-view schematic structural diagram of FIG. 7.
Figure 9:
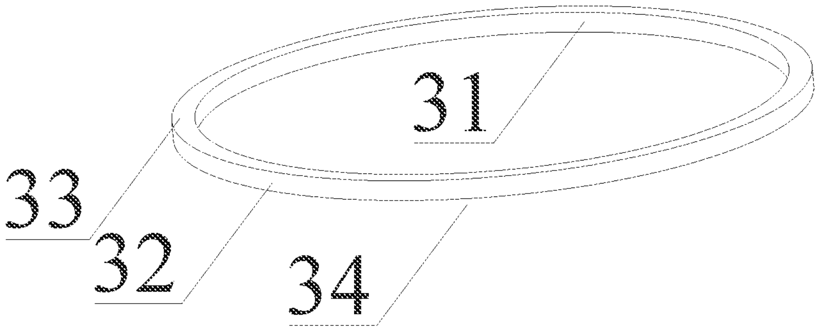
FIG. 9 is a schematic structural diagram of an annular sealing end cover.
Figure 10:
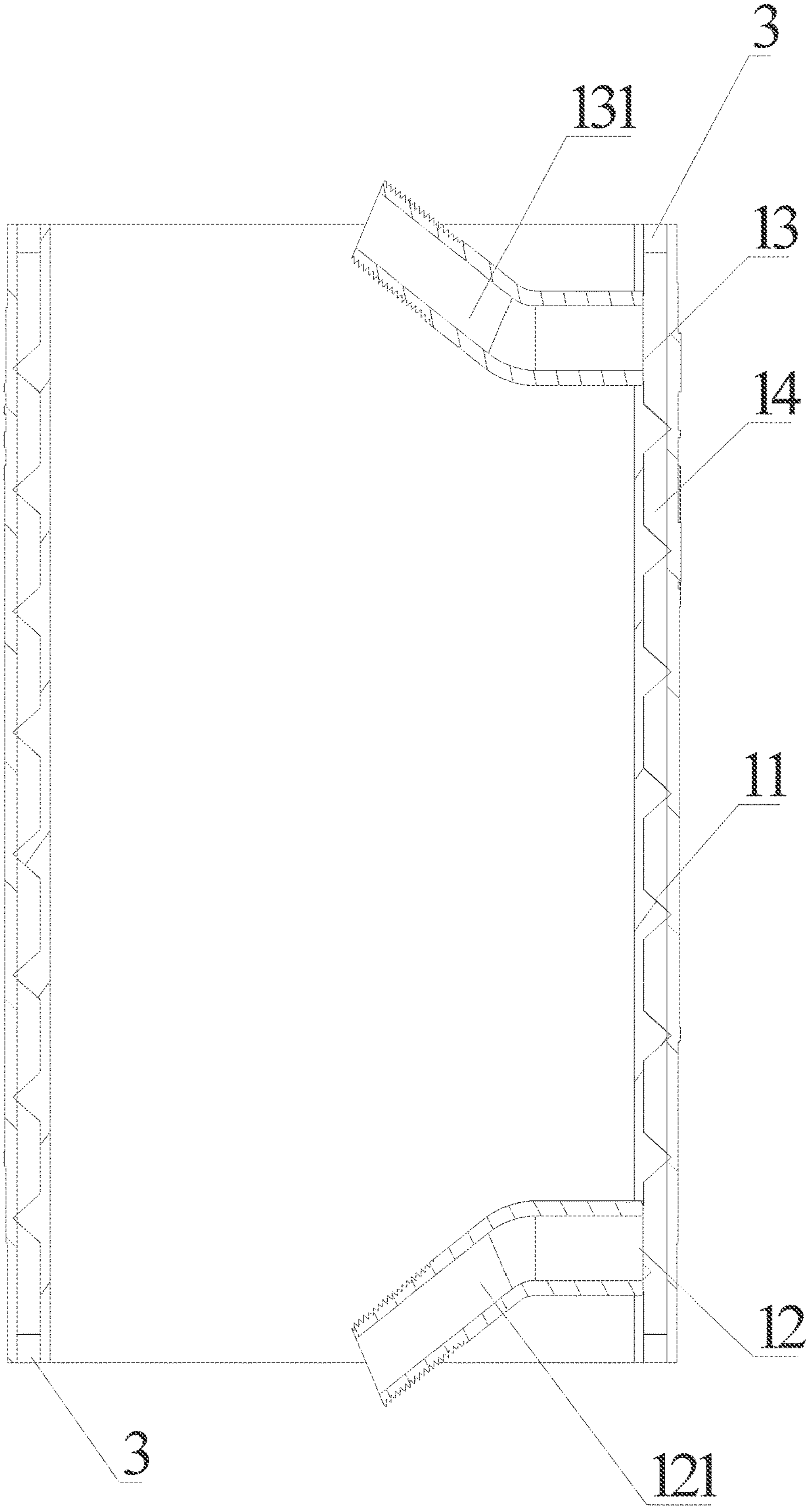
FIG. 10 is a cutaway drawing in an A-A direction in FIG. 8.

In addition, as shown in FIG. 7, the heating assembly 20 includes an insulation medium layer 211 configured on the outer peripheral wall of the outer tube 21 and a heating circuit 22 configured at the insulation medium layer 211. The insulation medium layer 211 is burned on the outer peripheral wall of the outer tube 21, and heat generated by the heating circuit 22 is used to exchange heat of the liquid flowing inside the spiral flow channel 14. Preferably, the wall thickness of the outer tube 21 ranges from 0.5 mm to 1 mm, and that of the inner tube 1 ranges from 0.3 mm to 1 mm.

Preferably, the heating circuit 22 includes multiple heating resistors 221 and electrodes 222 that are fastened to the insulation medium layer 211, and two ends of the heating resistor 221 are electrically connected to the electrodes 222. In this way, a power source is connected to the electrodes 222, so that the heating resistors 221 generate heat.

Preferably, an extension direction of each of the heating resistors 221 is the same as the length direction of the outer tube 21, and the liquid inlet 12 is connected to a water pump (not shown in the figure). The tubular heater assembly 10 further includes a first temperature sensor 223 and a first controller (for example, a PCB is used for control in this embodiment) electrically connected to the first temperature sensor 223. The first temperature sensor 223 is configured at a position on the outer tube 21 that is close to the liquid outlet 13. It can be seen from the figure that, in this embodiment, the liquid outlet 13 is disposed on the inner tube 1, and the first temperature sensor 223 is disposed as close to the liquid outlet 13 as possible and may be disposed at a radial position on the outer tube 21 that is closest to the liquid outlet 13. The first temperature sensor 223 can approximately detect a liquid temperature at the liquid outlet 13 by detecting a temperature of a tube wall of the outer tube 21 that is close to the liquid outlet 13. The PCB controls a water intake speed of the water pump and/or heating power of the heating resistors 221 based on temperature information sent by the first temperature sensor 223. Preferably, the first temperature sensor 223 is disposed at a position that is close to the liquid outlet 13 but is as far away from the heating resistors 221 as possible in the axial direction, so as to accurately detect the liquid temperature at the liquid outlet 13. In this way, the first temperature sensor 223 is configured to detect a discharged-liquid temperature and provide feedback to the PCB. The PCB compares actually measured discharged-liquid temperature data with a required discharged-liquid temperature specified by a user to automatically adjust the heating power of the heating resistors 221 or control the water pump to adjust a flow rate of the liquid entering the flow channel 14, thereby implementing accurate control on the discharged-liquid temperature.

To facilitate uniform heating of the liquid in the spiral flow channel 14, the multiple heating resistors 221 are distributed around the outer peripheral wall of the outer tube 21, and preferably, may be approximately uniformly distributed, so that the heating resistors 221 directly face the liquid in the flow channel 14 to transfer heat to the flowing liquid in a timely manner. In addition, the tubular heater assembly 10 further includes a second temperature sensor 224, and a second controller (for example, the PCB described above in this embodiment is used as the second controller for control) electrically connected to the second temperature sensor 224. The second temperature sensor 224 is disposed on the outer tube 21 and close to the heating resistors, and is configured to detect an outer tube temperature at a location of the second temperature sensor 224. The second controller (the PCB) is configured to receive an outer tube temperature sent by the second temperature sensor 224, and when the outer tube temperature is higher than a first preset temperature threshold in a first preset heating time period, control the heating circuit 22 to be disconnected and/or send no-liquid burning warning information. This is because when there is no liquid in the flow channel 14, heat generated by the heating resistors 221 cannot be transmitted to the liquid through an outer tube wall for heat dissipation. Consequently, when a temperature of the outer tube wall rapidly rises (higher than the first preset temperature threshold) in a short time (that is, within the first preset heating time period) or is higher than a second preset temperature threshold during operation, the PCB may control, based on outer tube temperature information sent by the second temperature sensor 224, the heating circuit to be disconnected and/or to send over-temperature protection warning information, thereby providing dry burning-resistant protection and avoiding the heating assembly 20 from being burned. Preferably, the first temperature sensor 223 and the second temperature sensor 224 are arranged in the length direction of the outer tube 21 to facilitate burnout imprinting and laser adjustment.

As a preferred implementation, because the liquid temperature at the liquid outlet 13 is the highest and water scale is accumulated faster, the second temperature sensor 224 may be disposed closer to the liquid outlet 13 than the liquid inlet 12. Preferably, the first temperature sensor 223 is disposed closer to the liquid outlet 13 than the second temperature sensor 224. To implement targeted accumulation of water scale, a power density of a heating resistor 221 near the second temperature sensor 224 may be made greater than that of a heating resistor that is circumferentially away from the second temperature sensor 224. In a case of non-dry burning, the second controller (the PCB) is further configured to receive an outer tube temperature sent by the second temperature sensor 224, and when the received outer tube temperature is higher than the second preset temperature threshold within a second preset heating time period, control the heating circuit to be disconnected and/or to send warning information for water scale limit protection.

Figure 2:
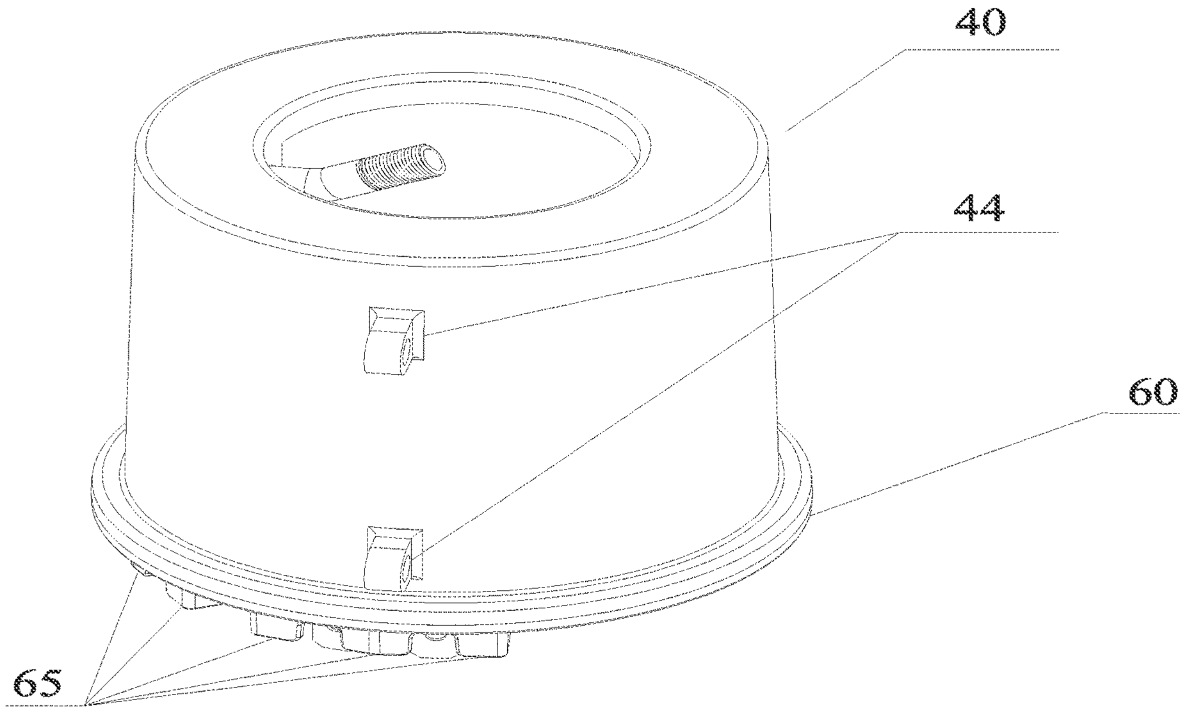
FIG. 2 is a 3-dimensional schematic structural diagram of FIG. 1.
Figure 3:
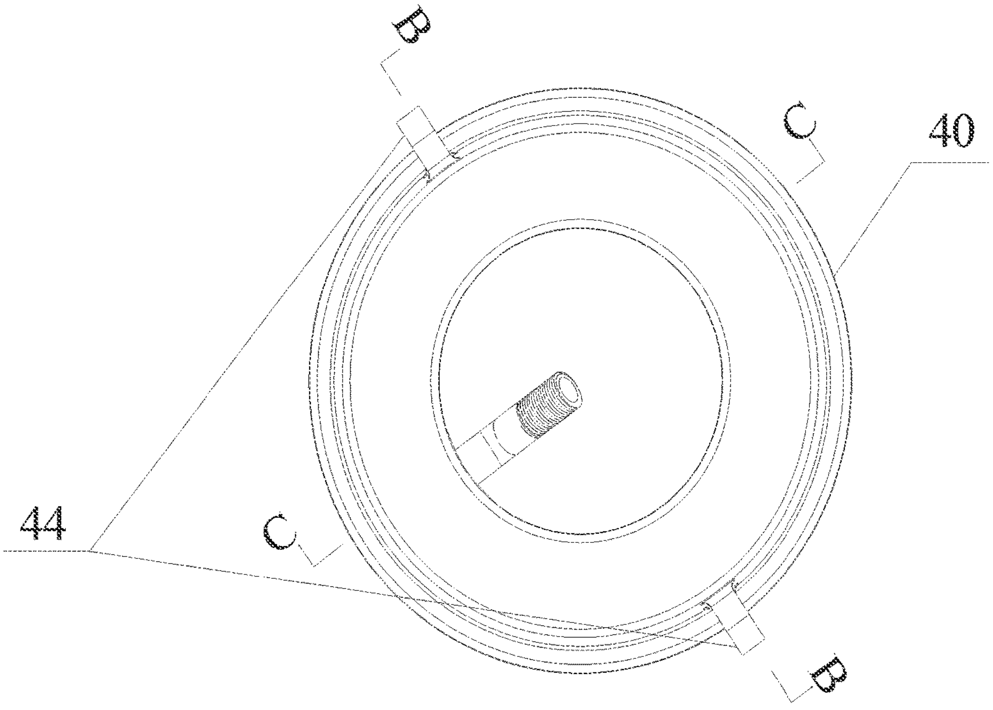
FIG. 3 is a top-view schematic structural diagram of FIG. 2.

A specific principle of water scale detection is as follows: An operating temperature (related to the power density) of the heating resistor 221 near the second temperature sensor 224 is made higher than that of a heating resistor 221 in another area, so that water scale starts to accumulate first around the second temperature sensor 224, and the amount of accumulated water scale is greater than that in another area. After the accumulated water scale reaches a certain degree, as the water scale has a large thermal resistance, that is, a small thermal conductivity coefficient, when the heating resistor 221 continuously transmits heat to the liquid in the flow channel 14, heat generated by the heating resistor 221 in a position with water scale accumulated cannot be transmitted to the liquid in the longitudinal direction through the stainless steel outer tube 21. As a result, a tube wall temperature of the outer tube 21 at this position rises, and the second temperature sensor 224 detects the outer tube temperature at this time and provides feedback to the PCB, which then sends information to remind the user of clearing the water scale and controls the heating circuit to be disconnected to stop heating, thereby effectively preventing a burning risk caused by local overheating of the heating resistor 221 due to accumulation of water scale. As shown in FIG. 2, a line width of a heating resistor around the second temperature sensor 224 may be reduced to increase a power density of the heating resistor. In this way, the second temperature sensor 224 provides an integrated detection function, and can implement a dry-burning resistance protection function and a water scale detection and reminding function to optimize functions of the tubular heater assembly 10.

Specifically, a method for water scale detection and limit protection is as follows:

S1: After the tubular heater assembly 10 starts to heat the liquid (in a non-dry burning state), the second temperature sensor 224 starts to detect an outer tube temperature, compares the outer tube temperature with the second preset temperature threshold preset by the second controller (for example, the foregoing PCB is used for control in this embodiment), and generates an execution command when the outer tube temperature reaches the second preset temperature threshold.

S2: Based on the execution command, control the electrode 222 to be disconnected, and send an information reminder for water scale limit protection, to remind the user of clearing water scale accumulated near the liquid outlet 13.

For example, when a discharged-liquid temperature at the liquid outlet 13 is 60° C. to 98° C., a temperature detected by the second temperature sensor 224 is 55° C. to 91° C. With an increase in a heating time, water scale starts to accumulate around the second temperature sensor 224. As the water scale increases to a certain degree, a temperature of the heating resistor increases, and heat generated by the heating resistor is horizontally transmitted to the second temperature sensor 224, which then detects an outer tube temperature at this time and provides feedback to the PCB for comparison with a protection threshold (for example, 103° C.) preset by the PCB. When the outer tube temperature is greater than 103° C., the PCB controls the power supply to be disconnected and sends a reminder of water scale limit protection to remind the user of clearing the water scale.

Preferably, as shown in FIG. 4, both the liquid inlet 12 and the liquid outlet 13 are disposed on the inner tube 1. A position on the inner tube 1 that corresponds to the liquid inlet 12 is provided with a liquid intake conduit 121. A position on the inner tube 1 that corresponds to the liquid outlet 13 is provided with a liquid discharge conduit 131. At least the liquid intake conduit 121 is disposed obliquely relative to a center line of the inner tube 1 such that the liquid can easily flows in. In addition, to facilitate mounting of the liquid intake conduit 121 and the liquid discharge conduit 131, the liquid intake conduit 121 and the liquid discharge conduit 131 are mounted in a cavity formed at the center of the inner tube 1.

According to the tubular heater assembly 10 provided in the embodiments of the present invention, the sealed connection form thereof enables a simple structure, low manufacturing costs, stable performance and a long service life in a high-temperature and high-pressure environment, a high edible safety coefficient for the stainless steel spiral flow channel 14, and a stable discharged-water temperature. In addition, water scale detection is added, which increases a service life for heating elements. Therefore, the tubular heater assembly 10 has relatively high application and promotion values.

The previous implementations are merely example implementations of the present invention, and are not intended to limit the protection scope of the present invention. Any non-substantial change and replacement made by a person skilled in the art on the basis of the present invention shall fall within the protection scope claimed by the present invention.

What is claimed is:

1. A tubular thick film heater protection apparatus, configured to protect a tubular heater assembly and comprising:

an upper tube, wherein the upper tube comprises an upper tube side surface and a toroid that are disposed with an inner space; an outer ring surface of the toroid is integrally connected to an upper portion of the upper tube side surface, and the radius of an inner ring surface of the toroid is less than the radius of an inner side surface of an inner tube of the tubular heater assembly; a flange downwardly extends along the inner ring surface of the toroid, and a space between the flange and an inner side wall of the upper tube side surface forms an upper groove that accommodates an upper portion of the tubular heater assembly; and a lower portion of the upper tube side surface is provided with a first locking mechanism; and a base, wherein a middle portion of the base is provided with a circular hole that allows a liquid discharge conduit of the tubular heater assembly to stick out, the base is further provided with a lower groove, the radius of an liner side surface of the lower groove is less than the radius of the inner side surface of the inner tube of the tubular heater assembly, and the radius of an outer side surface of the lower groove is greater than the radius of an outer side surface of an outer tube of the tubular heater assembly; the base is provided with an elastic contact piece, and when a lower portion of the tubular heater assembly is mounted on the lower groove, a terminal contact of the elastic contact piece can be connected to an electrode on the outer tube of the tubular heater assembly through contact; a side wall or the bottom of the base is provided with a wiring terminal, the wiring terminal is electrically connected to the elastic contact piece, and the wiring terminal can be externally connected to a power supply; and the base is provided with a second locking mechanism that matches and is locked with the first locking mechanism;

wherein the tubular thick film heater protection apparatus further comprises a first annular groove sealing ring disposed in the upper groove and a second annular groove sealing ring disposed in the lower groove, wherein a groove width of the first annular groove sealing ring matches the width of the upper portion of the tubular heater assembly, and a groove width of the second annular groove sealing ring matches the width of the lower portion of the tubular heater assembly.

2. The tubular thick film heater protection apparatus according to claim 1, wherein the upper tube is a cylinder, the base is a cylindrical base, the tubular thick film heater protection apparatus further comprises an annular sealing ring disposed on the cylindrical base, and the annular sealing ring is disposed in a junction portion between the cylinder and the cylindrical base.

3. The tubular thick film heater protection apparatus according to claim 2, wherein the base is provided with a first positioning apparatus, and the first positioning apparatus is configured to determine a matching position between the tubular heater assembly and the base, so that the terminal contact of the elastic contact piece can be connected to the electrode on the outer tube of the tubular heater assembly through contact; and a second positioning apparatus is disposed on the flange downwardly extending along the inner ring surface of the toroid, and the second positioning apparatus is configured to determine a matching position between the tubular heater assembly and the upper tube to implement position matching between the first locking mechanism and the second locking mechanism.

4. The tubular thick film heater protection apparatus according to claim 1, wherein the first locking mechanism comprises a clip with a bayonet, the second locking mechanism comprises an elastic component clamp with a protrusion, and a locking function can be implemented by matching the protrusion of the clamp with the bayonet of the clip; or:

the second locking mechanism comprises a clip with a bayonet, the first locking mechanism comprises an elastic component clamp with a protrusion, and a locking function can be implemented by matching the protrusion of the clamp with the bayonet of the clip.

5. The tubular thick film heater protection apparatus according to claim 4, wherein when the first locking mechanism is a clip with a bayonet, the bayonet is disposed on a lower portion of the inner side wall of the upper tube side surface; and a mounting and fastening apparatus is disposed on an outer side wall of the upper tube.

6. A tubular thick film heater with a protection function, comprising the tubular thick film heater protection apparatus according to claim 1, and further comprising a tubular heater assembly; wherein the upper portion of the tubular heater assembly is sleeved inside the upper groove, and the lower portion of the tubular heater assembly is sleeved inside the lower groove; and the tubular heater assembly comprises:

the inner tube, wherein a spiral flow guide structure is configured on an outer peripheral wall of the inner tube; and the outer tube, wherein the outer tube is sleeved outside the spiral flow guide structure; an outer peripheral wall of the outer tube is provided with a heating assembly; and an inner peripheral wall of the outer tube is spaced from the spiral flow guide structure by a predetermined radial gap; wherein a flow channel is formed between the inner tube and the outer tube, and an opening on at least one end of the flow channel is covered by a sealing end cover; and a cavity wall of the flow channel is provided with a liquid inlet and a liquid outlet; the liquid outlet is communicated with the liquid discharge conduit; and the sealing end cover is an annular sealing end cover, and the annular sealing end cover comprises an inner circular wall and an outer circular wall that are concentrically disposed, an upper sealing surface separately connected to an upper portion of the inner circular wall and an upper portion of the outer circular wall, and a lower sealing surface separately connected to a lower portion of the inner circular wall and a lower portion of the outer circular wall, wherein the inner circular wall is fastened to an outer peripheral wall termination of the inner tube through sealing, and the outer circular wall is fastened to an inner peripheral wall termination of the outer tube through sealing.

7. The tubular thick film heater with a protection function according to claim 6, wherein the spiral flow guide structure is formed by a spiral metal wire sleeved on the inner tube.

8. The tubular thick film heater with a protection function according to claim 7, wherein the spiral metal wire is a stainless steel wire, and the stainless steel wire is welded to the outer peripheral wall of the inner tube; and/or an axial cross-sectional shape of the spiral metal wire is a triangle, a trapezoid, or a rectangle, and/or two ends of the inner tube are respectively flush with two ends of the outer tube.

9. The tubular thick film heater with a protection function according to claim 6, wherein the heating assembly comprises an insulation medium layer configured on the outer peripheral wall of the outer tube and a heating circuit configured at the insulation medium layer, the heating circuit comprises multiple heating resistors and electrodes that are fastened to the insulation medium layer, and two ends of the heating resistor are electrically connected to the electrodes, respectively.

10. The tubular thick film heater with a protection function according to claim 9, wherein an extension direction of each of the heating resistors is the same as a length direction of the outer tube; the liquid inlet is connected to a water pump; and the heater assembly further comprises a first temperature sensor and a first controller electrically connected to the first temperature sensor; wherein the first temperature sensor is configured at a position on the outer tube that is close to the liquid outlet, and the first controller is configured to control a liquid intake speed of the water pump and/or heating power of the heating resistors based on temperature information sent by the first temperature sensor.

11. The tubular thick film heater with a protection function according to claim 10, wherein the multiple heating resistors are distributed around the outer peripheral wall of the outer tube; and the heater assembly further comprises a second temperature sensor and a second controller electrically connected to the second temperature sensor; wherein the second temperature sensor is disposed on the outer tube and close to the heating resistors, and is configured to detect an outer tube temperature at a position of the second temperature sensor; and the second controller is configured to receive the outer tube temperature sent by the second temperature sensor, and when the outer tube temperature is higher than a first preset temperature threshold in a first preset heating time period or is higher than a second preset temperature threshold during operation, control the heating circuit to be disconnected and/or send over-temperature protection warning information.

12. A tubular thick film heater protection apparatus, configured to protect a tubular heater assembly and comprising:

an upper tube, wherein the upper tube comprises an upper tube side surface and a toroid that are disposed with an inner space; an outer ring surface of the toroid is integrally connected to an upper portion of the upper tube side surface, and the radius of an inner ring surface of the toroid is less than the radius of an inner side surface of an inner tube of the tubular heater assembly; a flange downwardly extends along the inner ring surface of the toroid, and a space between the flange and an inner side wall of the upper tube side surface forms an upper groove that accommodates an upper portion of the tubular heater assembly; and a lower portion of the upper tube side surface is provided with a first locking mechanism; and a base, wherein a middle portion of the base is provided with a circular hole that allows a liquid discharge conduit of the tubular heater assembly to stick out, the base is further provided with a lower groove, the radius of an inner side surface of the lower groove is less than the radius of the inner side surface of the inner tube of the tubular heater assembly, and the radius of an outer side surface of the lower groove is greater than the radius of an outer side surface of an outer tube of the tubular heater assembly; the base is provided with an elastic contact piece, and when a lower portion of the tubular heater assembly is mounted on the lower groove, a terminal contact of the elastic contact piece can be connected to an electrode on the outer tube of the tubular heater assembly through contact; a side wall or the bottom of the base is provided with a wiring terminal, the wiring terminal is electrically connected to the elastic contact piece, and the wiring terminal can be externally connected to a power supply; and the base is provided with a second locking mechanism that matches and is locked with the first locking mechanism;

wherein the upper tube is a cylinder, the base is a cylindrical base, the tubular thick film heater protection apparatus further comprises an annular sealing ring disposed on the cylindrical base, and the annular sealing ring is disposed in a junction portion between the cylinder and the cylindrical base;

wherein the base is provided with a first positioning apparatus, and the first positioning apparatus is configured to determine a matching position between the tubular heater assembly and the base, so that the terminal contact of the elastic contact piece can be connected to the electrode on the outer tube of the tubular heater assembly through contact; and a second positioning apparatus is disposed on the flange downwardly extending along the inner ring surface of the toroid, and the second positioning apparatus is configured to determine a matching position between the tubular heater assembly and the upper tube to implement position matching between the first locking mechanism and the second locking mechanism.

* * * * *